(12) United States Patent
Gurski et al.

(10) Patent No.: US 8,192,696 B2
(45) Date of Patent: Jun. 5, 2012

(54) SYSTEM AND PROCESS OF BIODIESEL PRODUCTION

(76) Inventors: Stephanie Marie Gurski, Port Moody (CA); Anam Kazim, Toronto (CA); Hoi Ki Cheung, Richmond Hill (CA); Amani Obeid, London (CA)

( * ) Notice: Subject to any disclaimer, the term of this patent is extended or adjusted under 35 U.S.C. 154(b) by 110 days.

(21) Appl. No.: 12/592,072

(22) Filed: Nov. 18, 2009

(65) Prior Publication Data

US 2010/0166620 A1 Jul. 1, 2010

Related U.S. Application Data

(60) Provisional application No. 61/115,693, filed on Nov. 18, 2008, provisional application No. 61/161,465, filed on Mar. 19, 2009.

(51) Int. Cl.
| | |
|---|---|
| *B01J 8/00* | (2006.01) |
| *B01J 19/00* | (2006.01) |
| *B01J 8/02* | (2006.01) |
| *B01J 35/02* | (2006.01) |
| *C10L 1/10* | (2006.01) |
| *C10L 1/00* | (2006.01) |
| *C10L 1/18* | (2006.01) |

(52) U.S. Cl. ........ 422/234; 422/129; 422/187; 422/211; 44/306; 44/307; 44/308; 44/310; 44/385; 44/388; 44/398

(58) Field of Classification Search ................... 422/234, 422/223, 187, 129, 211; 558/117, 89, 87, 558/70, 1; 44/306, 307, 308, 310, 385, 388, 44/398

See application file for complete search history.

(56) References Cited

U.S. PATENT DOCUMENTS

| | | | |
|---|---|---|---|
| 6,174,501 B1 | 1/2001 | Noureddini | |
| 6,262,285 B1 * | 7/2001 | McDonald | 554/169 |
| 6,642,399 B2 | 11/2003 | Boocock | |
| 6,712,867 B1 | 3/2004 | Boocock | |
| 6,965,044 B1 | 11/2005 | Hammond et al. | |
| 7,112,229 B2 | 9/2006 | Khalil et al. | |
| 7,420,072 B2 | 9/2008 | Fleisher | |
| 7,806,905 B2 * | 10/2010 | Ford et al. | 606/151 |
| 2002/0013486 A1 * | 1/2002 | Ergun et al. | 554/174 |
| 2007/0101640 A1 * | 5/2007 | Tsuto et al. | 44/389 |
| 2008/0021232 A1 | 1/2008 | Lin et al. | |
| 2008/0209799 A1 | 9/2008 | Woods et al. | |

(Continued)

FOREIGN PATENT DOCUMENTS

| | | |
|---|---|---|
| CA | EP1206437 B9 | 6/2006 |
| GB | WO2007/113530 A2 | 10/2007 |
| US | EP1889889 A1 | 2/2008 |

(Continued)

OTHER PUBLICATIONS

Toda, M. et al. "Biodiesel made with sugar catalyst". Nature, Nov. 10, 2005, 438, 178.

(Continued)

*Primary Examiner* — Walter D Griffin
*Assistant Examiner* — Natasha Young

(57) ABSTRACT

A system and process for continuous production of fatty acid methyl esters (FAME) from the fatty acid triglycerides of waste oil via transesterification in the presence of a reusable sugar-based catalyst. The system and process incorporates re-cycling and re-use of waste by-product streams to result in a near-zero emissions, with a 97% product yield mix consisting of almost pure biodiesel and a very small percentage of impurities including glycerol.

27 Claims, 7 Drawing Sheets

U.S. PATENT DOCUMENTS

2008/0250700 A1* 10/2008 Tremblay et al. ............... 44/301
2009/0187035 A1* 7/2009 Ko et al. ....................... 554/168
2010/0063332 A1* 3/2010 Chang .......................... 568/852

OTHER PUBLICATIONS

Okamura, M. et al. "Acid-Catalyzed Reactions on Flexible Polycyclic Aromatic Carbon in Amorphous Carbon". Chemical Materials, 2006, 18, 3039-3045.

Zong, M-H. et al. "Preparation of a sugar catalyst and its use for highly efficient production of biodiesel". Green Chemistry, 2007, 9, 434-437.

Zhangs, Y. et al. "Biodiesel production from waste cooking oil: 1.Process design and technological assessment", Biosource Technology, 2003, 89, 1-16.

* cited by examiner

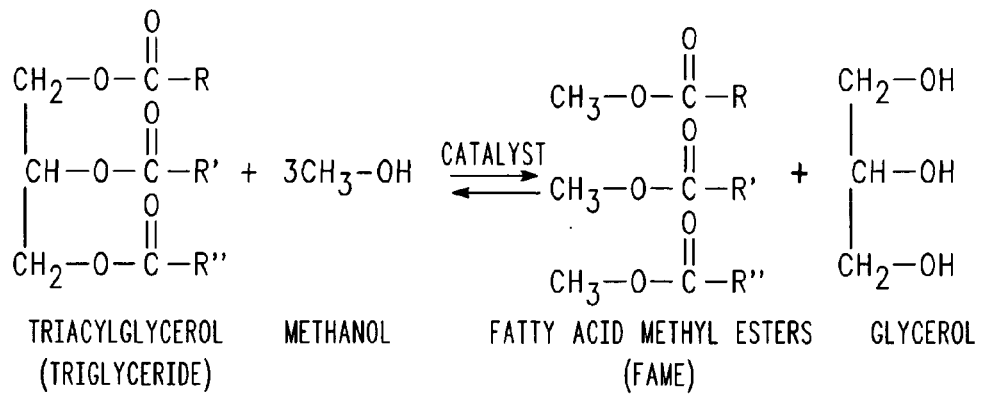
Fig. 1
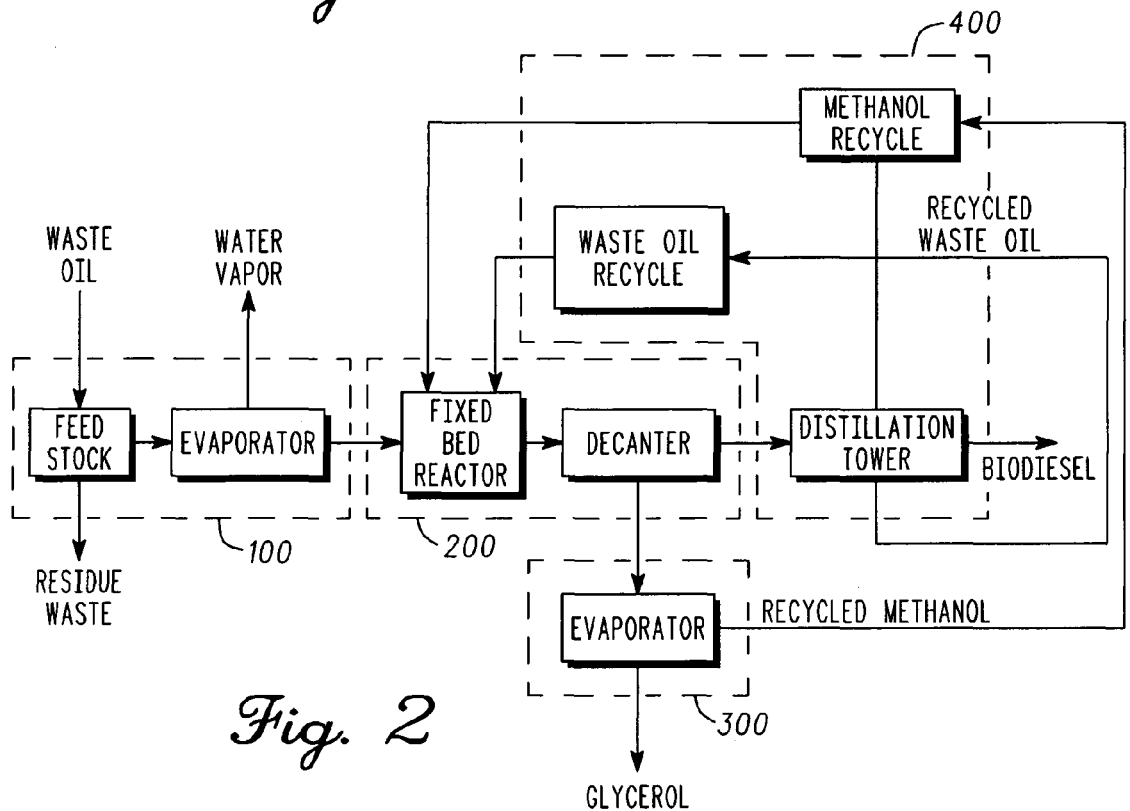
Fig. 2
| Fig. 3A | Fig. 3B | Fig. 3C |
|---|---|---|
| Fig. 3D | Fig. 3E | Fig. 3F |
Fig. 4

SYSTEM AND PROCESS OF BIODIESEL PRODUCTION

CLAIM OF PRIORITY

This application is based on U.S. Provisional Application Ser. No. 61/115,693 of the same title filed Nov. 18, 2008, and on U.S. Provisional Application Ser. No. 61/161,465 entitled "Improved Apparatus and Method for Biodiesel Production" filed Mar. 19, 2009. The priority of U.S. Patent Application Ser. No. 61/115,693 and Ser. No. 61/161,465 are hereby claimed and the disclosures incorporated into this application by reference.

FIELD OF THE INVENTION

The present invention relates to a system and process for the production of fatty acid methyl esters (FAME), commonly referred to as "biodiesel", obtained from a mixture of oils and grease of un-known composition which includes triglycerides, protein or other matter in some organic form containing sufficient fatty acids to be converted into biodiesel. In particular, the invention relates to a process for the transesterification of triglycerides in the presence of a high-performing and reusable sugar-based catalyst in which methanol and waste oil, for example yellow or brown grease, are converted to a product mix consisting of biodiesel and impurities.

BACKGROUND OF THE INVENTION

Disposal of agricultural-based waste such as food processing by-products, perishable items and products with fixed term shelf life as well as food waste from institutional facilities and restaurants is a significant problem. Solid organic agricultural bio-waste typically ends up in landfill sites while liquids are often disposed of via the local sewage systems. Waste oil products, such as yellow and brown grease, are most troublesome as they clog sewage systems and end up in natural water ways to detrimentally harm the ecosystem. In particular, Canada, with a population of approximately 35 million, specifically produces approximately 140,000 tonnes of waste cooking oil (WCO) each year primarily from the fast-food and restaurant industries. The transesterification of oils to form esters, particularly methyl esters, has received considerable attention as an environmentally-friendly way of recycling and disposing of waste oil into biodiesel.

Biodiesel is a fuel derived from biologically sourced fatty acids such as fatty acid glycerides or fatty acid esters from lipid containing plant material, microbes or animals. It is a mono-alkyl ester derived from the processing of organic oils like vegetable oils and alcohols. Processing is typically carried out by an esterification reaction mechanism and is normally performed in an excess of alcohol to maximize conversion. Esterification may occur directly between a fatty acid and an alcohol, or via transesterification, such as between an ester and an alcohol. While vegetable oils and alcohols are the most common reactants in the esterification process, any source of fatty acid, such as free fatty acids, soaps, esters, lipids, glycerides, amides and monohydric alcohols may also be esterified, as well as be employed in various combinations as reagents in the esterification reaction.

Biodiesel, also known as fatty acid methyl esters (FAME), is produced through a transesterification process where waste oil and methanol are reacted in the presence of a catalyst; this reaction is described in FIG. 1.

At present, there are several different processes involving catalysis that may be used to generate biodiesel from waste oils. The processes differ from each other based on the type of catalyst used, and are generally classified as follows:
1. Homogeneous basic catalyst;
2. Homogeneous acidic catalyst;
3. Heterogeneous basic catalyst; and
4. Heterogeneous acidic catalyst.

Homogeneous Basic Catalyst

The oldest method to produce biodiesel is through the use of a strong, liquid-formed, basic catalyst. The advantages with this process are the rapid transesterification reaction and cheap cost of the catalyst. However, this catalyst suffers from a serious limitation. The total free fatty acid (FFA) content of the lipid feedstock must not exceed 0.5 wt %, otherwise soap is produced as a by-product which requires extra units and steps for its removal, which subsequently increases the production cost of biodiesel. Other disadvantages include: difficulty in separating the liquid catalyst from the product; the catalyst's danger to operators due to its basic nature; and the fact that the catalyst cannot be recycled. Since the catalyst can only be used once, it leaves the process as waste; fresh catalyst must be continually added for the process to continue. Common homogeneous basic catalysts used are sodium hydroxide (NaOH) and potassium hydroxide (KOH). Noureddini (U.S. Pat. No. 6,174,501), Hammond, E. et al., (U.S. Pat. No. 6,965,044), Khalil, C. et al. (U.S. Pat. No. 7,112,229), and Woods, R. et al. (US 2008/0209799) utilize homogenous basic catalysis for the production of biodiesel.

Homogeneous Acidic Catalyst

Another popular choice for biodiesel production is to utilize a homogeneous acidic catalyst as it is cheap to purchase. Although the transesterification reaction using this catalyst is considerably slower compared to using liquid basic catalyst, this can be remedied if more methanol is added though it may increase the production cost. On the other hand, this may be a fair trade-off since biodiesel production using acidic catalyst does not produce soap as a by-product despite the FFA content of the lipid feedstock. The homogeneous acidic catalyst shares the disadvantages of the liquid basic catalyst-the catalyst is difficult to separate from the product, it poses a danger to the operators, and it cannot be reused in the reaction. This leads to a problem with waste generation as well as a large need for fresh catalyst. The most commonly used and efficient liquid acidic catalyst is sulfuric acid ($H_2SO_4$).

Heterogeneous Basic Catalyst

In order to reduce the amount of waste generated from used (i.e. spent) liquid basic catalysts, heterogeneous alkaline catalysts were developed as they can be recycled back into the production process. Additional advantages of this type of catalyst are that it can be easily separated from the product, and it is generally less harmful to handle than a homogeneous catalyst. The main disadvantages are the catalyst's high cost and the extremely slow reaction rate. Although the addition of methanol to the reaction can improve the reaction speed, the reaction process will still continue to run slower than when using either acidic or basic homogeneous catalysts. Another factor to consider is the catalyst's reusability as heterogeneous catalysts tend to degrade and lose their activity from leeching during the process. Several examples of a heterogeneous basic catalyst are magnesium oxide (MgO), calcium methoxide $Ca(CH_3O)_2$, and zinc oxide (ZnO). Lin, V. et al. (US 2008/0021232) discloses methods of preparing such catalysts for the production of biodiesel.

Heterogeneous Acidic Catalyst

Similar to the heterogeneous basic catalyst, heterogeneous acidic catalysts are safer to human health than their homogeneous counterparts as they are less corrosive. In addition, heterogeneous acidic catalysts result in a reduction of waste as such catalysts can be recycled, but unfortunately leeching and catalyst degradation may also occur. Other disadvantages are that production and recovery costs for this type of catalyst tend to run very high, which is a common trait shared among most heterogeneous catalysts. The rate of production of biodiesel is also decreased compared to using liquid catalyst as well. Some popular heterogeneous acidic catalysts that are used include Amberlyst-15, Nafion and zeolites. Several different methods utilizing heterogeneous acidic catalysis for the production of biodiesel have been disclosed by Fleisher, C. (U.S. Pat. No. 7,420,072), Boocock, D. (U.S. Pat. No. 6,642,399, U.S. Pat. No. 6,712,867, EP 1,206,437 B9), Jackam, J. et al. (EP 1,889, 889 A1), and Horton, C. (WO 2007/113530). While employing such catalysis, these alternate methods are typically limited by use of harsh chemicals and solvents in their reaction and purification processes.

Recently, a potential new, organic source heterogeneous acidic catalyst has been identified-sugar. Sugar catalyst is a promising option for esterification reactions due to its advantages pertaining to its organic nature, cost, re-usability and effectiveness. Toda et al. (Nature, 2005), Okamura et al. (Chem. Mater. 2006) and Zong et al. (Green Chem. 2007) disclose methods of producing such carbon-based catalysts by sulphonating an incomplete carbonization of D-glucose, creating a robust, re-usable catalyst that that does not lose its activity from leaching. Because it is non-reactive it is safe, as well as being non-toxic, environmentally friendly and relatively inexpensive. The major disadvantage with a sugar catalyst is that the transesterification reaction rate is lower than using homogeneous acidic catalysts. Zong et al. (Green Chem. 2007) also report it is one of the most efficient catalysts allowing 97% conversion of waste oil to biodiesel with only a 10:1 methanol to oil ratio. It has the added advantage of being able to be recycled up to 50 times, thus making the reaction process more cost efficient as the catalyst does not have to be replaced frequently.

SUMMARY OF THE INVENTION

A system and process is disclosed which combines several unit operations into an economical, environmentally friendly process for the conversion of fatty acids into FAME (i.e. biodiesel) in the presence of an environmentally friendly heterogeneous acidic catalyst.

The invention relates to a process for converting low-quality fatty acid feedstock in the form of waste oil, such as cooking oil or grease, into high quality biodiesel and purified glycerol in an efficient and economically feasible manner.

In another important aspect of the embodiment, the heterogeneous acidic catalyst is from an natural source. In the preferred embodiment, the heterogeneous acidic catalyst is derived from a sugar.

In another aspect of the embodiment, the process incorporates recycling and re-use of waste by-product streams, to result in a near-zero emission process. The process both utilizes and produces methanol as well as waste oil, both of which are independently recycled back into the process, thereby both optimizing the overall efficiency of the process as well as having minimal negative impact on the environment.

In another aspect of the embodiment, residual waste and water are removed from the input waste oil feedstock via settling tanks and evaporation. The residual waste is recycled into compost and/or animal feed, and the clean water released into the environment without negative impact.

In the preferred embodiment, the major steps in the process include feedstock treatment; transesterification and glycerol separation; glycerol purification; and FAME separation and waste by-product recycling.

In the preferred embodiment, the process is a continuous process where waste by-products methanol and waste oil are re-cycled and returned for re-use back into the process stream.

BRIEF DESCRIPTION OF THE DRAWINGS

Preferred embodiments will be described with reference to certain drawings. The drawings described are only schematic and are non-limiting. In the drawings, the size of some elements may be exaggerated and not drawn to scale for illustrative purposes. The dimensions and the relative dimensions do not correspond to actual dimensions.

The features of the invention will be better understood by reference to the accompanying drawings which illustrate presently preferred embodiments of the invention. In the drawings:

FIG. 1 is the transesterification reaction of triglycerides with methanol to produce FAME and glycerol;

FIG. 2 is a schematic block diagram of the system and process of biodiesel production from waste oil utilizing a sugar catalyst in the transesterification process, in accordance with the process of the invention disclosed herein;

FIG. 4 is a diagrammatic depiction of the order in which to arrange FIGS. 3A through 3F to view the process flow diagram in its entirety.

DETAILED DESCRIPTION OF THE PREFERRED EMBODIMENT

Figure 3A:
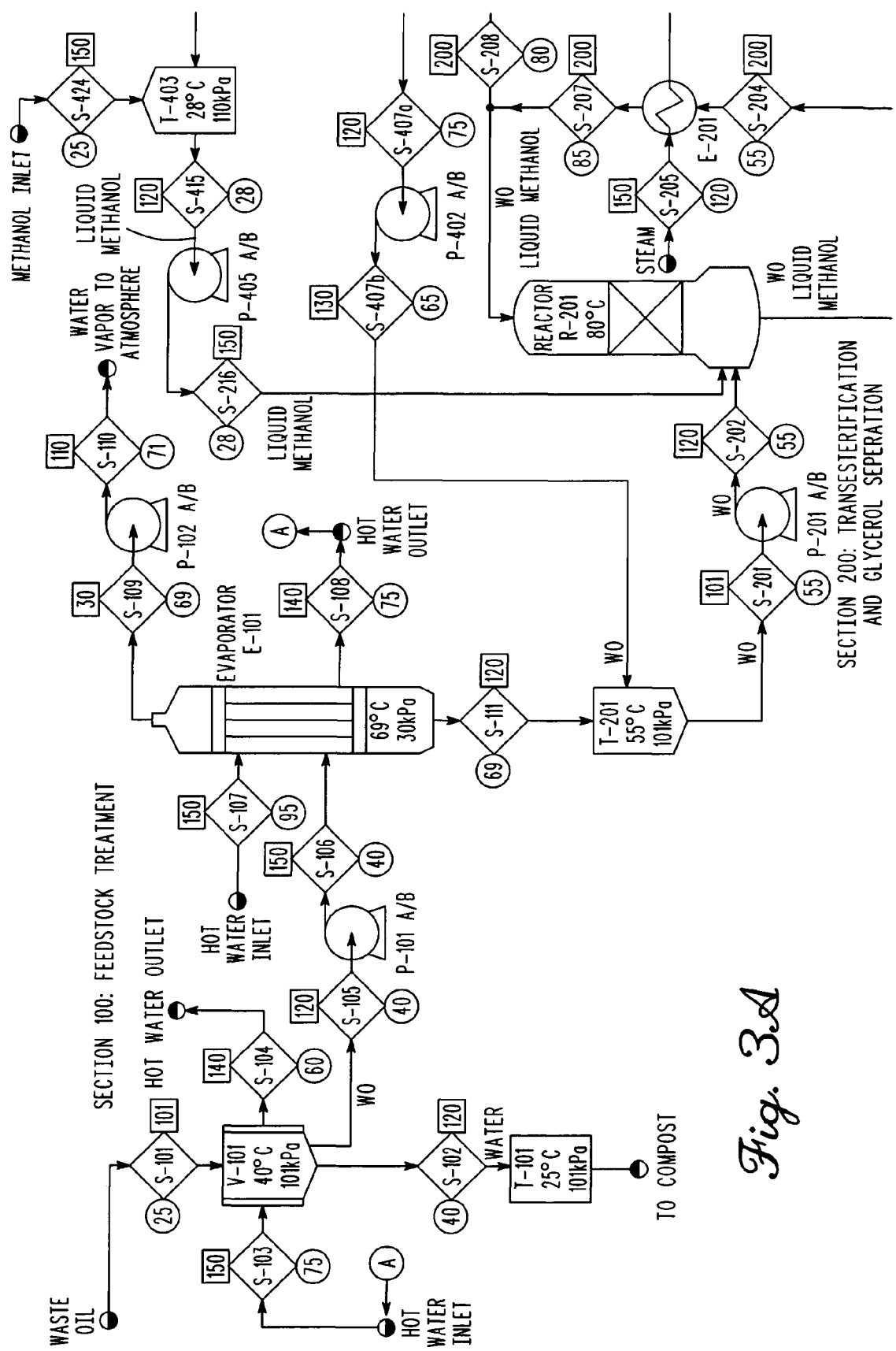
FIG. 3 is a schematic process flow diagram comprising FIGS. 3A through 3F respectively, of the process of biodiesel production from waste oil utilizing a sugar catalyst in the transesterification process, in accordance with the process of the invention disclosed herein.

The following description and examples illustrate a preferred embodiment of the present invention in detail. Those skilled in the art will recognize that there are numerous variations and modifications of this invention that are encompassed by its scope. Accordingly, the description of a preferred embodiment should not be deemed to limit the scope of the present invention.

The preferred apparatus and method of biodiesel production from waste oil obtained from a mixture of un-known composition which includes oils, grease, triglycerides, protein or other matter in some organic form containing sufficient fatty acids to be converted into biodiesel in the presence of a sugar catalyst, for example yellow or brown grease, is disclosed as follows. Although the description presented herein specifically is written with reference to 'waste oil', this term is used to include and generally describe any mixture of un-known composition having the characteristics previously mentioned. The process involves transesterification of the mixture in the presence of a high-performing and reusable sugar-based catalyst, in which methanol and waste oil are converted to a product mix consisting of biodiesel and impurities including glycerol.

Referring to FIG. 2, a high level overview of the disclosed system and process to convert free fatty acids in the presence of a sugar-based catalyst to produce FAME; the main sections and units of the process are as follows:

1. Feedstock treatment (100);
2. Transesterification and glycerol separation (200);

3. Glycerol purification (300); and
4. FAME separation and waste by-product recycling (400).

In the feedstock treatment section (100), the input stream or feed (i.e. waste oil) is collected then treated to remove impurities such as waste food particles as bottoms sludge and water as vapor, before the purified waste oil enters the transesterification and glycerol separation section (200). The residual waste in the feed storage tank is collected and removed for other uses such as animal feed, compost or bio-gas production.

In Section 200, the transesterification reaction to product FAME and glycerol, separation of glycerol from FAME takes place. A fixed bed reactor is used as this reactor type is preferred for heterogeneous catalysts. The process employs two parallel setups (i.e. A and B) where each set-up contains a fixed bed reactor and a feed storage tank for the transesterification reaction. It takes approximately 5 hours in order for a 97% conversion to be achieved per set-up, where during this time the reactor's outlet is continuously recycled back into the reactor. In order to allow a continuous flow to the units downstream of the reactor, a parallel set-up employing a second identical reactor is used. The reactors are timed so that one starts working after another; using this set-up, one reactor is always active pumping out products for downstream processing, while the other is recycling its product stream. Another advantage to this set-up is for catalyst replacement. The production facility will not be required to completely shut down its operations since there will always be one reactor running while the other is having its catalyst changed. Downstream of the parallel reactors, the units are specifically chosen to minimize costs. In particular, a decanter is used for glycerol and biodiesel separation as it is one of the most cost effective methods for the task.

In the glycerol purification section (300), an evaporator is used for glycerol purification as it is less expensive than a distillation tower and results in high purity output stream (i.e. purified glycerol).

In the FAME separation and waste by-products recycling section (400), a distillation tower is used for FAME separation as it is capable of producing 99.7% purity of biodiesel as per ASTM standards. The disclosed system, apparatus and methods to produce biodiesel requires safe operating conditions of the units as well as the release of no pollutants that cause environmental hazards. To reduce waste production, the un-reacted methanol and waste oil streams coming out of the distillation tower are recycled back to the feed. Unfortunately, a small amount of methanol is generated from glycerol purification that cannot be recycled. However, methanol helps plants effectively absorb nutrients if diluted. This small quantity of un-recycled methanol will be diluted with water condensed from the waste water vapor, and converted into a fertilizer for agricultural purposes. Thus, the overall process as disclosed is highly cost efficient with near zero emissions.

To more fully appreciate the novel and inventive aspects of the disclosed system, apparatus and process, the preferred embodiment is described in greater detail with reference to FIG. 4, and FIGS. 3A through 3F. With reference to FIGS. 3A through 3F, it is noted that the convention A/B denotes a unit and its backup unit for use by the system to ensure a continuous process, and within the following description it is understood that the same operational conditions are in effect for all units having the same number. With reference to the following description, it should be noted that all pumps, denoted by reference 'Pxxx' are designed to have backup units, and the description may be written without inclusion of the A/B reference designation.

Section 100: Feedstock Treatment

Referring to FIG. 3A, waste oil is input into the process at ambient conditions is transported from the delivery truck or other delivery mechanism, through stream S-101 to the conical settling tank (V-101), where water and impurities, such as food particles and other residue waste, flow to the bottom. The settling tank contains a heating jacket which serves two purposes: to speed up the settling process, and to heat the waste oil close to the desired temperature required for the reaction. The heating jacket contains hot water entering at approximately 75° C. and 150 kPa (S-103). The water exits the jacket at approximately 60° C. and 140 kPa (S-104). The jacket raises the temperature of the waste oil to 40° C. inside the settling tank.

Two streams leave the settling tank. The first, stream S-102, transports the residue waste and water, at approximately 40° C. and 120 kPa, to the storage tank (T-101). The storage tank is not heated, and the temperature of the contents will decrease to ambient conditions. The contents are then periodically removed for composting, use in animal feed, or other such purposes.

The second stream exiting the settling tank, S-105, transports the waste oil at approximately 40° C. and 120 kPa to the centrifugal pump (P-101 A/B). The waste oil stream, comprised of mostly waste oil and a very small percentage of water, is then pumped into stream S-106 at approximately 40° C. and 150 kPa to the evaporator (E-101). The evaporator serves two purposes: to remove any leftover water content, and to further heat the waste oil to the temperature required for the reaction to take place. This is accomplished through the use of a heating jacket, in which hot water inlet stream enters the evaporator's tubes at approximately 95° C. and 150 kPa (S-107), and exits at approximately 75° C. and 140 kPa (S-108).

Inside the evaporator, the waste oil temperature is raised to approximately 69° C. and its pressure is lowered to approximately 30 kPa to further remove any leftover water content. The water is removed from the waste oil in the form of vapor at approximately 69° C. and 30 kPa into stream S-109. The vapor then enters the vacuum pump (P-102 A/B) and exists into stream S-110 at approximately 71° C. and 110 kPa. Meanwhile, the purified waste oil leaves the evaporator through stream S-111 at approximately 69° C. and 120 kPa, and enters storage tank T-201 in Section 200: Transesterification and Glycerol Separation. The waste oil cooking is now at the desired temperature and ready for transesterification.

Regarding operational safety and biohazards, the feedstock treatment section of the process is generally considered to be safe, as it does not contain substances that are harmful from an environmental or chemical perspective. The feed is essentially un-purified waste oil containing water and waste residual food.

Section 200: Transesterification and Glycerol Separation

In this section, the transesterification reaction to produce FAME and glycerol, and the separation of glycerol from FAME, take place. Stream S-202 containing waste oil at the temperature of approximately 55° C. and pressure of about 120 kPa enters reactor R-201. Methanol in stream S-216 at approximately 28° C. and 150 kPa is also fed to the bottom of the unit. A pump (P-201A) is required to send waste oil in stream S-201 from the tank (T-201) to the reactor (R-201), while the methanol stream is pumped to the unit R-201 from Section 400. The pump (P-201A) changes the pressure of stream S-201 from approximately 101 kPa to 120 kPa, and the new stream S-202 with a higher pressure enters the unit.

In the fixed bed reactor (R-201) the transesterification reaction takes place in which waste oil reacts with methanol at the molar ratio of 1:10 in the presence of a solid sugar-based catalyst prepared to produce FAME and glycerol. The reaction taking place inside the reactor is presented in FIG. 1.

The fixed bed reactor is packed with the solid sugar-based catalyst and operates at approximately 80° C. The temperature of the reactor is optimal for the transesterification reaction in the presence of the sugar catalyst at the 1:10 molar ratio of waste oil to methanol. A fixed bed reactor is selected as it gives the maximum yield whenever a solid catalyst is used in the reaction. The transesterification takes approximately 5 hours to achieve approximately 97% conversion of waste oil to FAME.

Although the aforementioned process is described with reference to a single reactor, the process preferentially employs two parallel setups (i.e. A and B) where each set-up contains a fixed bed reactor and a feed storage tank for the transesterification reaction. Such a configuration facilitates the continuous process and system operation. It takes approximately 5 hours in order for an approximately 97% conversion to be achieved per set-up (i.e. A or B depending which is presently on-line) where during this time the reactor's output is continuously recycled back into the reactor. In order to allow a continuous flow to the units downstream of the reactor, this parallel set-up uses reactors which are timed. Using this set-up, one reactor is always active pumping out products for downstream processing, while the other is still recycling its product stream to complete the reaction. Another advantage to this set-up is for catalyst replacement. The production facility will not be required to completely shut off its operations since there will always be one reactor running while the other can have its catalyst changed. Downstream of the parallel reactors, the units are specifically chosen to minimize costs. In particular, a decanter is used for glycerol and biodiesel separation as it is one of the most cost effective methods for the task.

Figure 3B:
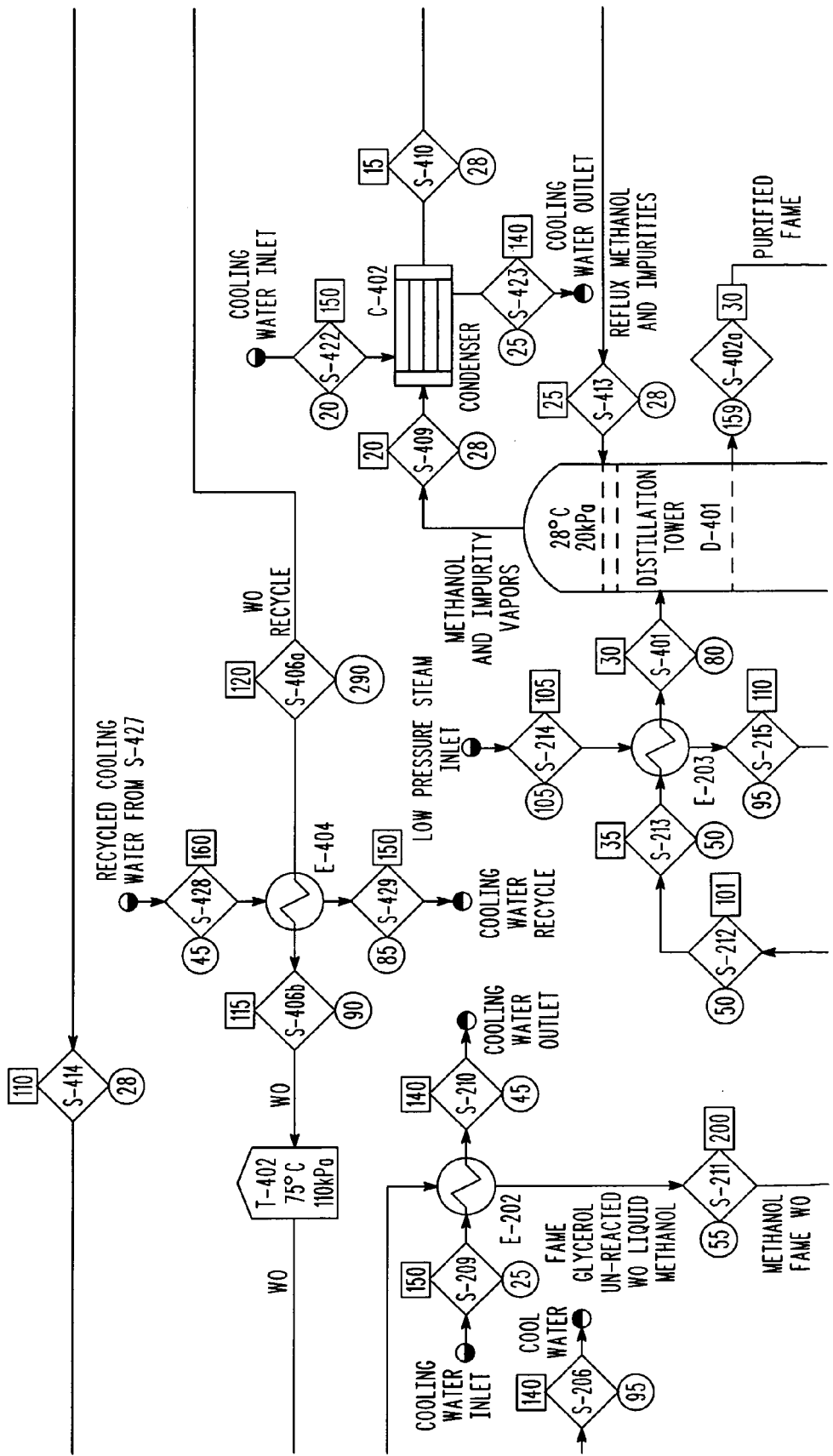
Figure 3C:
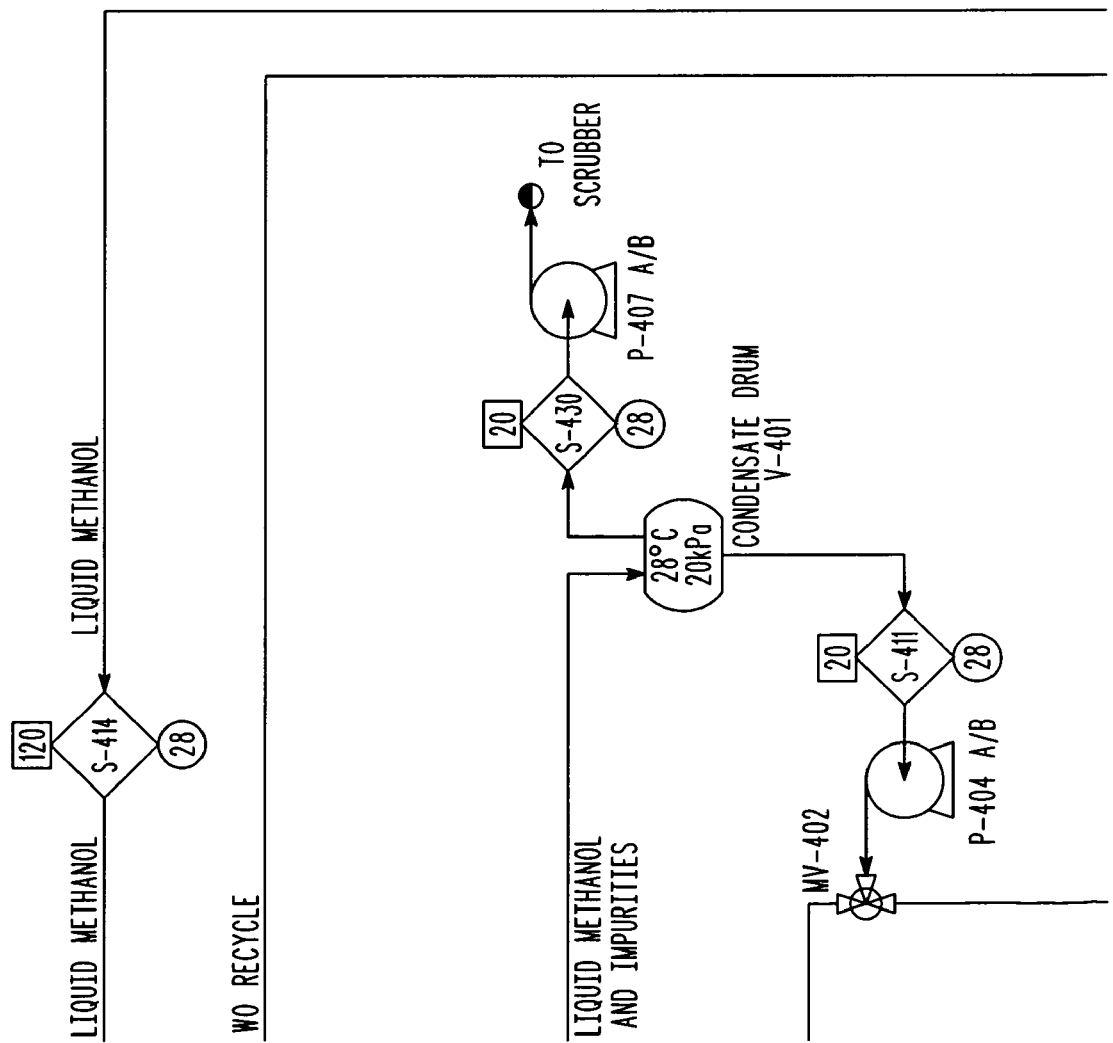
Figure 3D:
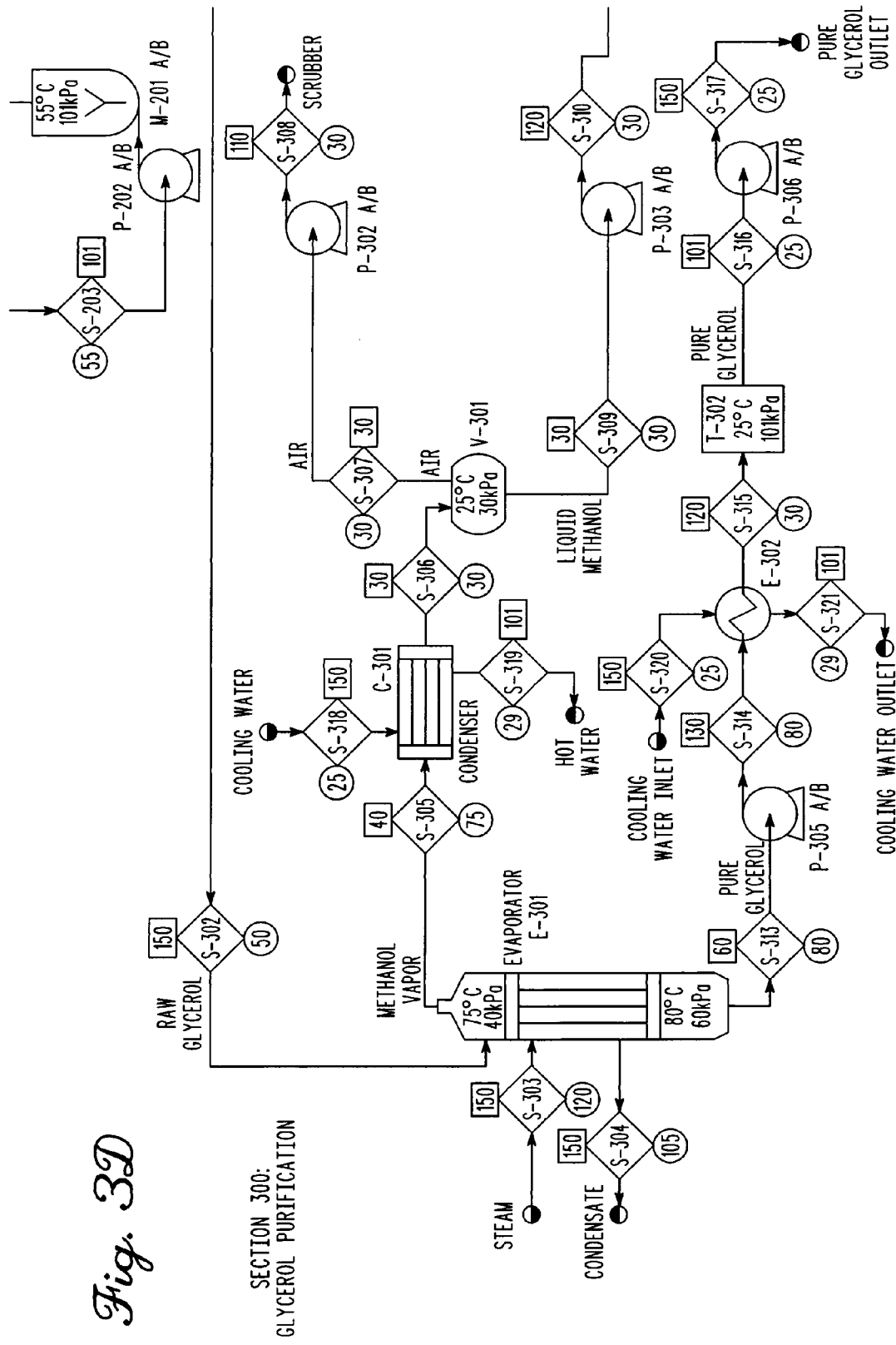

Referring to FIG. 3A and also FIG. 3D, once the unit R-201 is filled with feed it leaves the unit in stream S-203 at temperature and pressure of approximately 55° C. and 101 kPa respectively and goes to the pump P-202 A. The pumped stream (S-204) with the pressure of 200 kPa goes through the mixer M-201 to keep waste oil and methanol well mixed during the process. The well mixed stream S-204 at about 200 kPa and 55° C. is sent to a heat exchanger E-201 where it is heated up to the temperature of approximately 85° C. and the heated stream S-207 then enters the reactor (R-201). There is a temperature drop of approximately 5° C. in stream S-207 after it enters the unit R-201. The operating temperature of the unit, which is approximately 80° C., is maintained due to the heat of the inlet stream. This batch operation continues for approximately 5 hours until the conversion of approximately 97% is achieved. Once the desired conversion is obtained, the product consisting of FAME, glycerol, un-reacted waste oil and methanol, and water is released via stream S-208 at approximately 80° C. and 200 kPa; moving to FIG. 3B, the stream is cooled to a temperature of approximately 55° C. in a heat exchanger E-202. Stream S-208 is cooled to avoid methanol vaporization after it enters the decanter. The cooled stream S-211 is then sent to a decanter DC-201 for FAME and glycerol separation shown in FIG. 3E.

Figure 3E:
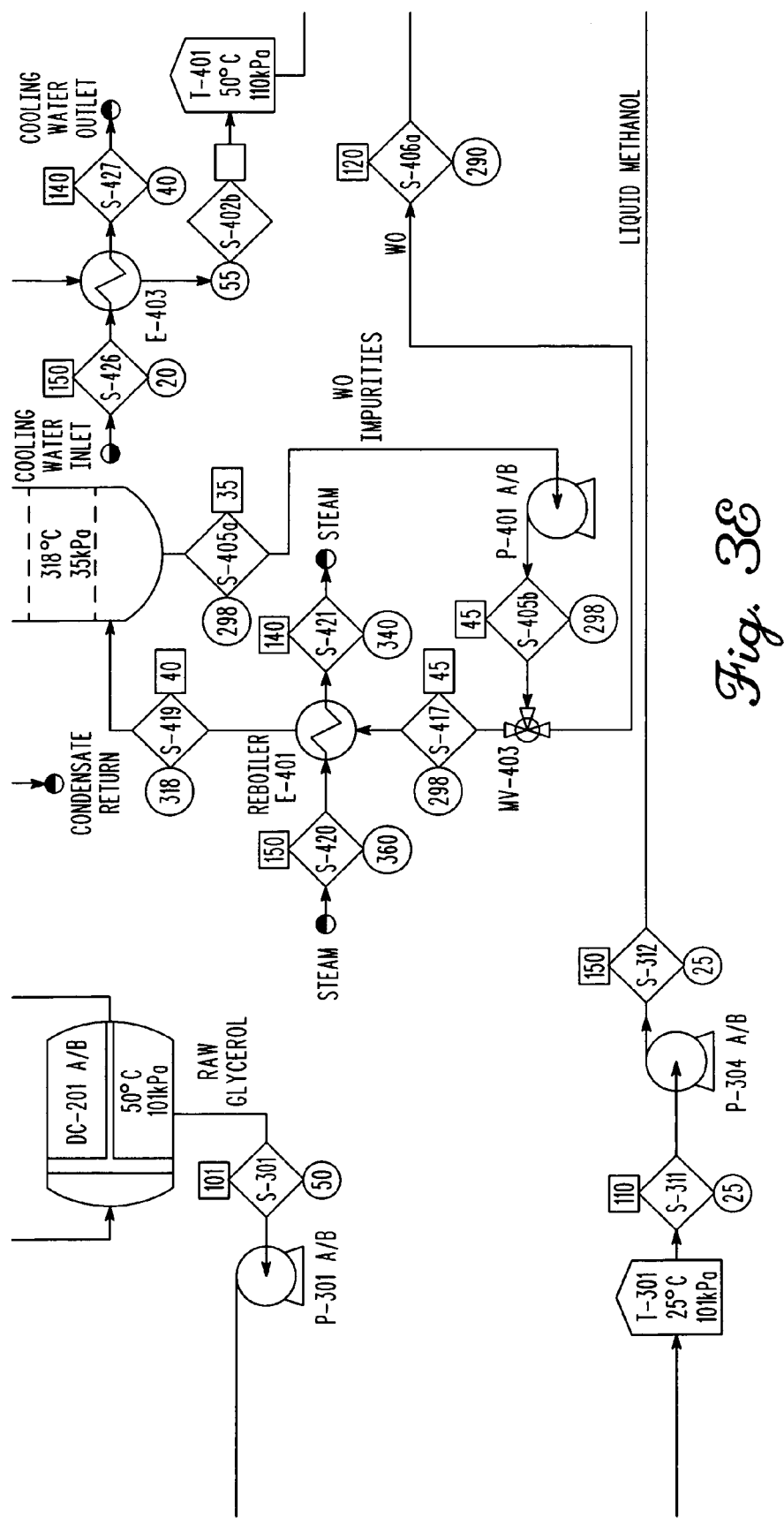

Referring to FIG. 3E, the decanter the temperature and pressure are approximately 50° C. and 101 kPa respectively. The decanter is insulated so that there is a temperature drop of approximately 5° C. in the mixture coming from the reactor (R-201). Glycerol is heavier than FAME and has higher density than FAME. Therefore it settles at the bottom of the decanter (DC-201) whereas FAME, being less dense, forms a layer at the top of the decanter (DC-201). The mixture is allowed to stay in the decanter (DC-201) for approximately 8 hours for the complete separation of glycerol from FAME. After the separation, glycerol with 60% (wt) of the methanol in the product stream is allowed to flow via stream S-301 at approximately 50° C. and 101 kPa by opening the bottom valve of the decanter. The stream is sent to Section 300: Glycerol Purification (FIG. 3D).

Returning again to the decanter DC-201 in FIGS. 3E and 3B, the top layer from the decanter containing FAME, together with the remaining approximately 40% (wt) of the methanol, leaves in stream S-212 at approximately 50° C. and 101 kPa. The pressure of the stream drops to approximately 35 kPa before it enters the heat exchanger E-203 as shown in FIG. 3B. The stream S-213 is heated in the heat exchanger E-203 to approximately 80° C., which is the optimal temperature for FAME entering the distillation tower D-401 in Section 400: FAME Separation and Waste By-Product Recycling, where FAME is separated from impurities.

Regarding operational safety and biohazards, this section of the process is quite safe in terms of its operating conditions as most of the substances being used, such as waste oil, FAME, and glycerol, are not highly flammable or reactive and are involved in the process below their flash points of 188° C., 148° C. and 160° C. respectively. In addition, sugar catalysts are safe to handle as they are neither reactive nor flammable and do not release pollutants. Methanol is the only substance that is highly flammable and explosive with a very low flash point of 12° C. Therefore, safety measures are required to run the process safely as methanol is used above its flash point. For this reason, pipes, pumps, vessels and tanks are all grounded, and storage tanks vents to atmosphere are sized for fire-heated emergency vapor release. Also, there is sufficient ventilation to cope with the maximum vapor levels in the building. Overall, the section has safe operating conditions with few highly flammable chemicals. There are no pollutants being released and all required precautionary safety measures have been taken to avoid risk of fire and explosion from methanol.

Section 300: Glycerol Purification

Referring to FIG. 3D, crude glycerol enters Section 300 as stream S-301 at approximately 50° C. under atmospheric pressure (i.e. 101 kPa). Its composition is approximately 18.6 mol % glycerol and approximately 81.4 mol % methanol. This liquid mixture is pumped by P-301 into the falling film evaporator E-301. Once there, the crude glycerol enters E-301 at approximately 50° C., 150 kPa (S-302). The evaporator, operating at a vacuum of approximately 40 kPa, will heat the glycerol feed causing methanol to separate from glycerol by vaporizing the methanol. The unit's heating source is steam (stream S-303) that enters the evaporator at approximately 120° C., 150 kPa. It leaves the evaporator as a condensate at approximately 105° C., 150 kPa (S-304).

When the separation is complete, methanol exits the evaporator as a vapor (S-305) at approximately 75° C., 40 kPa. It is cooled in condenser C-301 by cooling water (S-318) entering the unit at approximately 25° C., 150 kPa. The water leaves at approximately 29° C. under atmospheric pressure as stream S-319 while the cooled methanol (S-306), in liquid form, exits the condenser at approximately 30° C., 30 kPa (S-306). Liquid methanol is collected in the condenser drum V-301 operating at approximately 25° C. and 30 kPa. V-301 has an important role since it is through this unit that the vacuum is controlled and generated for evaporator E-301. As such, the pressure of the vessel needs to be maintained at 30 kPa. This is achieved by using the vacuum pump P-302 to continuously draw air out of the vessel. S-307 represents the air stream exiting the vessel and entering the pump. S-308 represents the air stream leaving the pump to enter a scrubber so that any stray methanol vapor is captured to prevent accidental methanol release. Meanwhile, liquid methanol exits the condenser drum (S-309) at approximately 30° C., 30 kPa and is brought to the storage tank T-301 by pump P-303 as shown in FIG. 3E. As the methanol enters tank T-301 it is at approximately 30° C. and 120 kPa (S-310). The storage tank operates under ambient conditions and is designed to hold up to 24 hours' worth of methanol. Once holding capacity of the tank has been reached, the collected methanol leaves the tank (S-311) and is pumped by P-304 as a recycled stream back into the process. This recycle stream (S-312) exits Section 300 at approximately 25° C., 150 kPa with a composition of close to pure methanol and a very small percentage of glycerol.

Referring to FIG. 3D, the second product stream from evaporator E-301, the purified glycerol, exits the unit at approximately 80° C., 60 kPa with a composition of approximately 99 mol % glycerol and 1% methanol (S-313). Product stream S-313 is brought to heat exchanger E-302 after being pumped by P-305 (S-314). As the pure glycerol flows through E-302, cooling water at approximately 25° C. (S-320) is used to bring down the temperature of the glycerol. Water (S-321) leaves the heat exchanger at approximately 29° C. and atmospheric pressure while the glycerol (S-315) leaves at approximately 30° C., 120 kPa to enter the storage tank T-302. T-302, operating under ambient conditions, is large enough to hold 24 hours' worth of glycerol. Once the holding capacity of the tank is reached, the glycerol is pumped out by pump P-306 and to an outlet mechanism (S-317) such as a truck or other transport mechanism for further use or sale to clients. The purified glycerol leaves Section 300 at approximately 25° C.

Regarding operational safety and biohazards, precautions must be taken regarding methanol and glycerol. Methanol is a colourless, volatile chemical and is separated from glycerol in the falling film evaporator; it exits as vapor. Should the vapor escape, there is a potential risk of explosion and fire as well as poisoning if inhaled or ingested. To mitigate these risks the methanol vapor is cooled to room temperature before storage. As a liquid, there is no risk of methanol inhalation. In addition, spill dikes are installed around the peaked-roof holding tank. The tank itself will be located away from all sources of ignition, and will be well grounded to control any vapor emissions. The material used for the tank should be compatible with methanol and as such, lead, nickel, copper alloys, zinc and aluminum should be avoided. Explosion proof pumps are used for transporting the liquid methanol into and out of the holding tank.

Glycerol, in comparison to methanol, is considered to be safer due to its low toxicity, low volatility, and high flash point (160° C.). Under the conditions operated in the evaporator, glycerol remains as a liquid, thereby eliminating the dangers associated with inhalation of the chemical. Although glycerol can cause irritation to the skin and eyes on contact, this chemical is stable under normal conditions and it can be stored easily in a flat-roofed tank.

Section 400: FAME Separation and Waste By-Product Recycling

In this section biodiesel (FAME) is separated from impurities via distillation. The separated streams are sent to storage tanks to either recycle waste streams back into the process, or in the case of FAME, to be stored ready for transport to customers via trucks or other transportation mechanisms. A distillation tower is used rather than a more inexpensive flash tower because it is important to have high purity product meeting ASTM biodiesel certification standards ($\geq$99.6% purity). Although this section is described according to conditions required for a single distillation tower separating FAME product via a side stream from a methanol distillate and waste oil bottoms, a two tower design may also be implemented to optimize the process.

Referring to FIG. 3B, feed stream (S-401) contains a mixture of waste oil, methanol and a majority percentage of FAME, the desired product. S-401 enters distillation tower D-401 at approximately 80° C. and 30 kPa. D-401 is operated at a condenser conditions of approximately 28° C. and 20 kPa and reboiler conditions of approximately 318° C. and 35 kPa. Methanol vapor has the greatest relative volatility and exits the top in stream S-409. Waste oil and FAME are separated lower in the tower, where the operating temperature is approximately 318° C. (35 kPa). Vacuum conditions are utilized to avoid the thermal degradation of FAME, which has a flash point of 164° C. under atmospheric conditions. FAME is susceptible to thermal decomposition above 250° C. (1 atm). Waste oil has a flash point under standard conditions of 204.5° C. Waste oil has a lower relative volatility than FAME, thus it exits as the bottoms stream at approximately 298° C. and 35 kPa (S-405a). FAME exits via the side stream at approximately 159° C. and 30 kPa (S-402a).

Figure 3F:
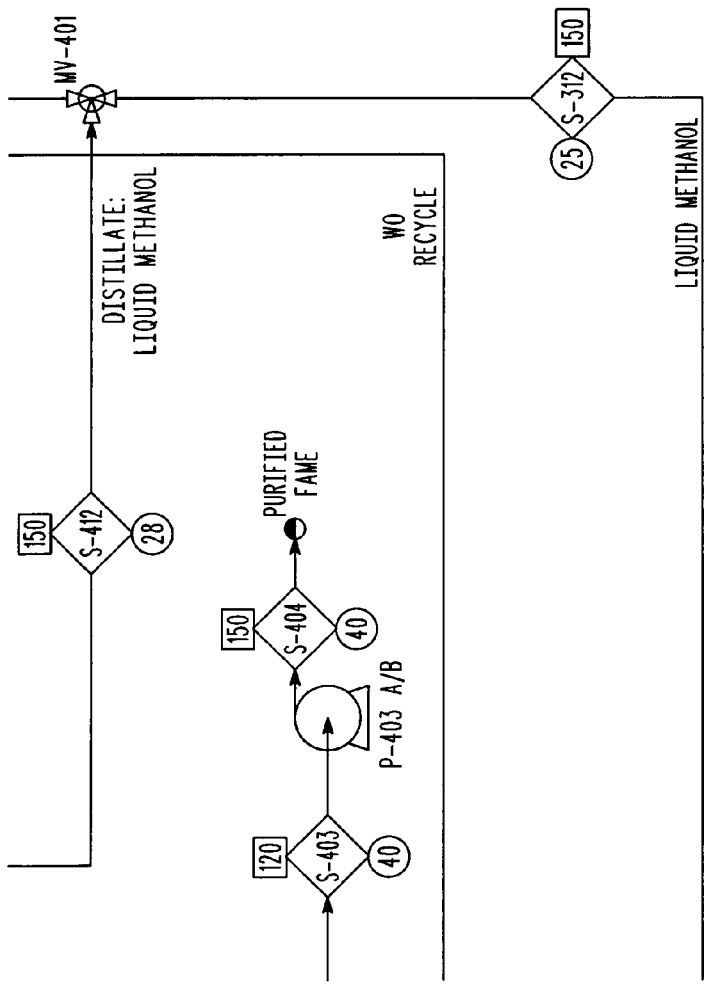
Figure 3F:
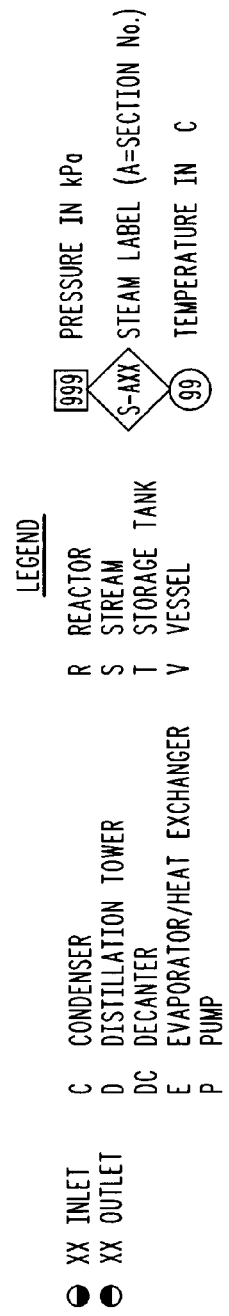

Stream S-409 exits the top containing vaporized methanol at approximately 28° C. and 20 kPa. Passing through condenser C-402 and into stream S-410 (at approximately 28° C. and 15 kPa), the vapor condenses. Cooling water (S-422 at approximately 20° C. and 150 kPa) is used. The warm water leaves the condenser at approximately 25° C. and 140 kPa (S-423). Leaving C-402, the liquid methanol (S-410) at approximately 28° C. and 20 kPa is temporarily collected in condensate drum V-401, as shown in FIG. 3C. Vacuum pump P-407 is used to maintain the vacuum conditions for the tower set in the condensate drum V-401. The outlet stream from P-407 is sent to a scrubber system (outlet 'To Scrubber') in the event any methanol vapor impurities arise. Methanol recovered via the condensate drum V-401 returns to the distillation tower as stream S-413, the stream exiting from the drum (S-411) is split via valve MV-402 after it is pumped through P-404, increasing its pressure to approximately 25 kPa (S-413). Referring to FIG. 3B, methanol reflux S-413 re-enters the distillation tower (D-401) at approximately 28° C. and 25 kPa. Referring to FIGS. 3B and 3F, methanol distillate flows first via S-412 (FIG. 3F) and then in stream S-414 (FIG. 3B) at approximately 28° C. and 120 kPa to the main methanol storage tank, T-403 in FIG. 3A. As shown in FIG. 3A, both new (i.e. S-424 at ambient temperature and approximately 150 kPa) and recycled (S-414) methanol is stored in the conical storage tank T-403 at near ambient conditions. Methanol enters the holding tank from an inlet such as a suppliers' truck. Liquid methanol is pumped from storage tank T-403 to the reactor, R-201 (via stream S-415). This occurs via pump P-405, which increases the pressure of the stream to approximately 150 kPa (S-216).

Referring to FIG. 3E, waste oil bottoms with FAME residuals at approximately 298° C. and 35 kPa are drawn from the distillation tower D-401 as stream S-405a and via pump P-401 as reboiler stream S-417. Pressure is increased to approximately 45 kPa through pump P-401 (S-405b). Reboiler E-401 heats the stream (S-417) to approximately 318° C. at 40 kPa (S-419), so that FAME residuals are re-vaporized before being injected back as S-419 into the distillation tower (D-401). Steam at approximately 360° C. and 150 kPa (S-420) is used for heating the reboiler. Steam leaves the reboiler (S-421) at approximately 340° C. and 140 kPa.

Waste oil bottoms exit the tower (S-405b) at approximately 298° C. and 45 kPa. A splitter valve (MV-403) is used which increases the stream's pressure to approximately 120 kPa, and it flows via stream S-406a to conical storage tank T-402 (in FIG. 3B) to be recycled. The waste oil is stored at approximately 75° C. and close to atmospheric pressure. T-402 connects to the reactor, R-201 (FIG. 3A) via S-407a. From T-402, waste oil stream S-407a at about 120 kPa is increased to approximately 130 kPa and 65° C. by pump P-402.

Referring to both FIGS. 3B and 3E, FAME product exits the distillation tower (S-402a) at approximately 159° C. and 30 kPa. It is cooled by condenser E-403 (FIG. 3E) prior to storage in conical storage tank T-401. As stream S-402a exits the tower it contains a portion of vaporized FAME. It is condensed into stream S-402b (at approximately 55° C.), via the heat exchanger's cooling water stream S-426 at approximately 20° C. and 150 kPa. The cooling water leaves (S-427) at approximately 40° C. and 140 kPa. Purified FAME waits in conical storage tank T-401 (stored at approximately 50° C. near ambient pressure) to be transported to the transportation outlet mechanism. Moving to FIG. 3F, pump P-403 increases the product stream's pressure from approximately 120 kPa (S-403, at approximately 40° C.) to approximately 150 kPa to move the purified FAME (S-404) to the transportation outlet mechanism.

Regarding operational safety and biohazards, the main concern for the distillation tower, and in Section 400, is the explosion of vaporized methanol. Waste oil and biodiesel are not as dangerous because the tower is not operated near conditions where they are easily combustible. FAME is not susceptible to thermal decomposition below 250° C. at atmospheric pressure, so there should not be any difficulty with cracking or explosion at the operating temperature of the lower trays of the tower (318° C.) as it is under vacuum, and below the relevant flash point. Waste oil has an even higher flash point (and even lower combustion potential) than FAME; it will not vaporize, much less explode at the operating conditions, given its flash point of 204.5° C. at atmospheric pressure (again operating under vacuum circumvents any potential problems). Waste oil storage takes place in a cost-conscious, simple covered holding tank at its naturally cooled temperature and atmospheric pressure since there is no danger at these conditions.

In contrast, methanol presents considerable explosion danger as it has a low vaporization point, 65° C., and a flash point of 11° C., both at atmospheric pressure; it is very flammable. To mitigate explosion danger, both new and recycled methanol for the process is stored in one main conical storage tank at ambient conditions. By limiting the methanol to a main storage tank with proper safety designs such as berms of non-combustible material (for example, sand), the potential spills and danger are confined to a more limited area. The storage tank is not kept at a more thermodynamically efficient, higher temperature due to the explosion risk. This is also the reason for using a more costly but safer conical holding tank. The storage tank is also conveniently located away from sources of ignition like the hot distillation tower and the reactor.

In addition, methanol is poisonous to humans and animals in the environment, causing skin irritation, breathing difficulties, and damage to internal organs or blindness if ingested. Given its hazardous nature, it is kept from the outside environment as much as possible; this is why waste methanol is recycled extensively within the plant. One of the most important novel aspects is in the disclosed system, apparatus and method, is that all waste streams are recycled to the maximum possible extent; this is why both methanol and waste oil are distilled and recycled back into the reaction process. Energy and heat streams are also optimized and recycled. As a result of all of the above factors, this results in a near zero-emission process.

Thus, it will be apparent to those skilled in the art, the advantages and merits of the disclosed apparatus and process for the transesterification of fatty acid triglycerides in the presence of a high-performing and reusable sugar-based catalyst in which methanol and waste oil are converted to a product mix consisting of biodiesel, glycerol and other by-products in an near-zero emission process.

The above description discloses several methods and materials of the present invention. This invention is susceptible to modifications in the methods and materials as well as alterations in the equipment and apparatus. Such modifications will become apparent to those skilled in the art from consideration of this disclosure or practice of the invention disclosed herein. Consequently, it is not intended that the invention be limited to the specific embodiments disclosed herein, but that it covers all modifications and alternatives coming within the scope and spirit of the invention.

What is claimed is:

1. A system for the production of purified fatty acid methyl esters (FAME), the system comprising:
    a feedstock treatment section for receiving and processing an input feedstock to produce waste oil and input feedstock by-products;
    a transesterification and glycerol separation section for receiving the waste oil and an input methanol feedstock and reacting the waste oil and the input methanol feedstock via a transesterification process to produce a raw FAME mixture and raw glycerol;
    a glycerol purification section for receiving and processing the raw glycerol to produce pure glycerol and methanol;
    a waste by-products recycling section for receiving and recycling the methanol into the transesterification process; and
    a FAME separation and waste by-products recycling section for receiving and processing the raw FAME mixture to produce purified FAME, FAME impurities and FAME by-products,
    wherein the waste by-products recycling section is further for receiving and recycling the FAME by-products back into the transesterification and glycerol separation section for re-use by the transesterification reaction process, and
    wherein said waste by-product recycling section is further comprised of: a methanol recycling section receiving and recycling methanol turning it back to the transesterification and glycerol separation section for use in the transesterification reaction process; and a waste oil recycling section for receiving and recycling un-reacted waste oil by returning it back into the feedstock treatment section to be used in the transesterification reaction process.

2. The system according to claim 1, wherein the transesterification process involves a chemical reaction to convert methanol and an input feedstock via an transesterification reaction in the presence of a sugar-based catalyst into a raw FAME output.

3. The system according to claim 1, wherein said FAME separation section is comprised of a distillation tower having a first inlet coupled for receiving the raw FAME via a first distillation tower heat exchanger, the distillation tower having a first outlet for discharging waste oil and impurities coupled to a splitter valve, the splitter valve being further coupled to a reboiler and to the waste by-products recycling section, said distillation tower having a second inlet coupled from said reboiler back into the distillation tower for reprocessing the waste oil and impurities, the distillation tower being further coupled via a second outlet for discharging methanol vapor and various impurities to a condenser, the distillation tower being further coupled via a third outlet the discharge of purified FAME to second heat exchanger, and a third inlet for receiving reflux methanol and FAME impurities from said condenser for reprocessing within the distillation tower.

4. The system according to claim 3, wherein said first distillation tower heat exchanger has a first input to receive the raw FAME mixture, and has a second input to receive low pressure steam, the heat exchanger using the steam to heat the first input to an optimal temperature for discharge via a first output to the distillation tower, the heat exchanger being further coupled via a second output to a condensate return for discharge of steam condensate from the process.

5. The system according to claim 3, wherein said condenser having a first input for receiving the methanol and FAME impurities as vapor, and having a second input for receiving cooling water, said condenser using the cooling water to cause the methanol vapor to condense to methanol liquid, and said condenser having a first discharge outlet coupled to a condensing drum discharge the methanol liquid and impurities into the drum via the first discharge outlet, and said condenser having a second discharge outlet to discharge the cooling water for recycling into the process.

6. The system according to claim 5, wherein said condensing drum having a first output coupled to a scrubber, said scrubber being configured to capture methanol off-vapors, said condensing drum having a second output coupled to both the methanol recycling system and the distillation tower via a splitter valve.

7. The system according to claim 6, said wherein said splitter valve controls and directs the flow of the condensing drum discharging stream to either:
 a. the methanol recycling section of the FAME separation and waste by-product recycling section for recycling back into the process, said discharge stream being comprised of liquid methanol; or
 b. the distillation tower for reprocessing, said discharge stream being comprised of reflex methanol and impurities.

8. The system according to claim 3, wherein said second heat exchanger is a heat exchanger for the purpose of processing FAME, said second heat exchanger having a first input for receiving said purified FAME from the distillation tower, and a second input for receiving cooling liquid in the form of water, and a first discharge outlet for discharging cooled purified FAME, the first discharge outlet being coupled to a storage tank for receiving the cooled purified FAME, and a second discharge outlet for discharging and recycling the cooling water into the system.

9. The system according to claim 8, wherein the storage tank has a discharge outlet for the discharge of said purified FAME from the system.

10. The system according to claim 3, wherein said splitter valve being configured to direct and control the flow of said distillation tower first outlet stream to either:
 a. the reboiler when the outlet stream is comprised of waste oil and impurities; or
 b. the waste oil recycling section of the FAME separation and waste by-product recycling section for recycling back into the process when the outlet stream is comprised of waste oil without impurities.

11. The system according to claim 3, wherein said reboiler having a first input coupled to said splitter valve to receive the input stream waste oil and impurities from said distillation tower, said reboiler having a second input to receive steam which is used to re-heat and discharge the heated input stream back into the distillation tower via a first output coupled to said second input of the distillation tower, said reboiler having a second output to discharge and recycle steam back into the system.

12. A system for the production of purified fatty acid methyl esters (FAME), the system comprising:
 a feedstock treatment section for receiving and processing an input feedstock to produce waste oil and input feedstock by-products;
 a transesterification and glycerol separation section for receiving the waste oil and an input methanol feedstock and reacting the waste oil and the input methanol feedstock via a transesterification process to produce a raw FAME mixture and raw glycerol;
 a glycerol purification section for receiving and processing the raw glycerol to produce pure glycerol and methanol;
 a waste by-product recycling section for receiving and recycling the methanol into the transesterification process; and
 a FAME separation and waste by-product recycling section for receiving and processing the raw FAME mixture to produce purified FAME, FAME impurities and FAME by-products,
 wherein the waste by-product recycling section is further for receiving and recycling the FAME by-products back into the transesterification and glycerol separation section for re-use by the transesterification reaction process, and
 wherein said feedstock treatment section further comprises an input feedstock storage unit, said input feedstock storage unit having a first input for receiving the waste oil and a second input for receiving hot water, the input feedstock storage unit also being coupled via a first discharge outlet to an evaporator, the evaporator receiving a mixture of waste oil and water via the first discharge outlet, and the feedstock storage unit having a second discharge output coupled to a storage tank for receiving waste residue and water from the input feedstock storage unit.

13. The system according to claim 12, wherein said input feedstock storage unit is coupled to a third discharge outlet for the discharge and recycling of excess hot water within the system.

14. The system according to claim 13, wherein said waste oil storage tank is coupled via a first input to receive purified waste oil from the evaporator, and is further coupled to the waste oil recycling section via a second input to receive recycled waste oil causing the purified waste oil and the recycled waste oil to be combined, and the waste oil storage tank being coupled via a discharge outlet to the transesterification and glycerol separation section, causes the combined waste oil to be discharged via the outlet.

15. The system according to claim 12, wherein said evaporator has a first input for receiving the waste oil and water mixture, and a second input in the form of hot water, the evaporator using the hot water to heat the waste oil and water mixture to cause the water to vaporize and be discharged via a first discharge outlet, to produce purified waste oil which is discharged via a second discharge outlet to a waste oil storage tank.

16. A system for the production of purified fatty acid methyl esters (FAME), the system comprising:
 a feedstock treatment section for receiving and processing an input feedstock to produce waste oil and input feedstock by-products;
 a transesterification and glycerol separation section for receiving the waste oil and an input methanol feedstock and reacting the waste oil and the input methanol feedstock via a transesterification process to produce a raw FAME mixture and raw glycerol;

a glycerol purification section for receiving and processing the raw glycerol to produce pure glycerol and methanol;

a waste by-product recycling section for receiving and recycling the methanol into the transesterification process; and a FAME separation and waste by-product recycling section for receiving and processing the raw FAME mixture to produce purified FAME, FAME impurities and FAME by-products, wherein the waste by-product recycling section is further for receiving and recycling the FAME by-products back into the transesterification and glycerol separation section for re-use by the transesterification reaction process, wherein the transesterification and glycerol separation section is further comprised of a reactor, a mixer and a decanter, and wherein said reactor receives waste oil via a first input, the reactor receives methanol feedstock via a second input, the reactor being further coupled via a third input to also receive a mixture of waste oil and methanol, and the reactor also being further coupled to the mixer via a discharge outlet.

17. The system according to claim 16, wherein the reactor is a fixed bed reactor, said fixed bed reactor being packed with a sugar-based catalyst to cause a transesterification reaction between the waste oil input, methanol and a mixture of waste oil and methanol, and the sugar-based catalyst to produce an output mixture which is discharged via the discharge outlet to the mixer.

18. The system according to claim 17, wherein the output mixture is comprised of raw FAME output and glycerol.

19. The system according to claim 17, wherein the transesterification reaction within the fixed bed reactor in the presence of the sugar-based catalyst occurs at a 1:10 molar ratio of waste oil to methanol.

20. The system according to claim 17, wherein said output mixture is continually discharged to the mixer, the mixer being coupled to both the decanter and the third input of the reactor, the mixer is configured to continually return the waste oil and methanol to the reactor until the transesterification reaction is complete at which time the mixer discharges said raw FAME output and glycerol to said decanter.

21. The system according to claim 16, wherein said decanter is coupled via an input to said mixer to receive the input mixture from the mixer, and said decanter also being coupled via a first output to the glycerol purification section, and said decanter being further coupled via a second output to the FAME separation and waste by-product recycling section, the decanter on receiving the input mixture causes the mixture to separate and produce a raw glycerol which is discharged via the first output, and a mixture of raw FAME, methanol and waste oil vapors which is discharged via the second output.

22. The system according to claim 21, wherein said raw glycerol is a mixture compromised of glycerol and methanol.

23. A system for the production of purified fatty acid methyl esters (FAME) the system comprising:

a feedstock treatment section for receiving and processing an input feedstock to Produce waste oil and input feedstock by-products;

a transesterification and glycerol separation section for receiving the waste oil and an input methanol feedstock and reacting the waste oil and the input methanol feedstock via a transesterification process to produce a raw FAME mixture and raw glycerol;

a glycerol purification section for receiving and processing the raw glycerol to produce pure glycerol and methanol;

a waste by-product recycling section for receiving and recycling the methanol into the transesterification process; and a FAME separation waste by-product recycling section for receiving and processing raw FAME mixture to produce purified FAME, FAME impurities and FAME by-products, wherein the waste by-product recycling section is further for receiving and recycling the FAME by-products back, into the transesterification and glycerol separation section for re-use by the transesterification reaction process, and wherein said glycerol purification section is further comprised of an evaporator coupled to and having a first input to receive said raw glycerol from the transesterification and glycerol separation section, and having a second input to receive steam, the evaporator using the steam to cause separation of the glycerol from the methanol by vaporization of the methanol to product methanol vapor which is discharged via a first discharge outlet, pure glycerol which is discharged via a second discharge outlet, and water condensate which is discharged via a third discharge outlet.

24. The system according to claim 23, wherein said first discharge outlet is coupled to a condenser, said condenser having a first input for receiving the methanol vapor, and having a second input for receiving cooling liquid, said condenser using the cooling liquid to cause the methanol vapor to condense to methanol liquid, and said condenser having a first discharge outlet coupled to a condensing drum discharge the methanol liquid into the drum via the first discharge outlet, and said condenser having a second discharge outlet to discharge the heated cooling liquid as hot water for recycling into the process.

25. The system according to claim 24, wherein said condensing drum having a first output coupled to a scrubber, said scrubber being configured to capture any methanol off-vapors, said condensing drum also having a second output coupled to the methanol recycling system, said condensing drum discharging liquid methanol to the second output for return to the methanol recycling section of the FAME separation and waste by-product recycling section and re-use by the process.

26. The system according to claim 23, wherein said second discharge outlet is coupled to a heat exchanger, the heat exchanger having a first input for receiving said pure glycerol, and a second input for receiving cooling liquid in the form of water, and a first discharge outlet for discharging cooled pure glycerol, the first discharge outlet being coupled to a storage tank for receiving the cooled pure glycerol, and a second discharge outlet for discharging and recycling the cooling water into the system.

27. The system according to claim 26, wherein the storage tank has a discharge outlet for the discharge of pure glycerol from the system.

* * * * *